Oct. 17, 1939.  H. W. BOCKHOFF ET AL  2,176,414
DRILLING MACHINE WITH TAPPING ATTACHMENT
Filed Nov. 6, 1937  3 Sheets-Sheet 1
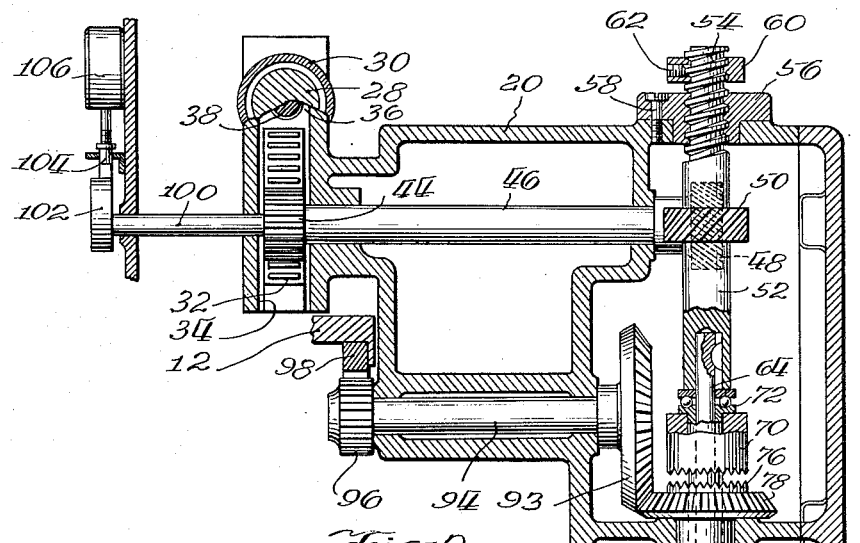
Fig. 2.
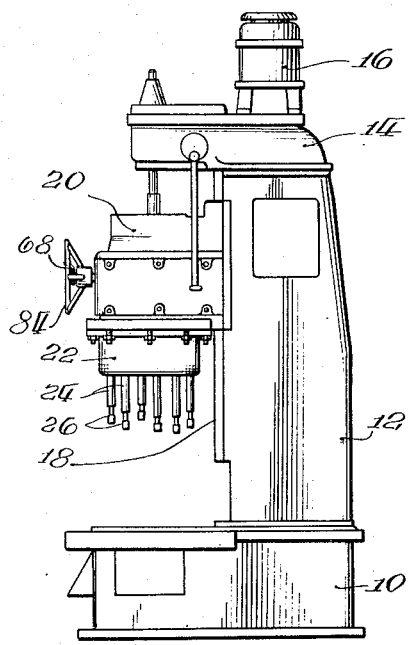
Fig. 1.
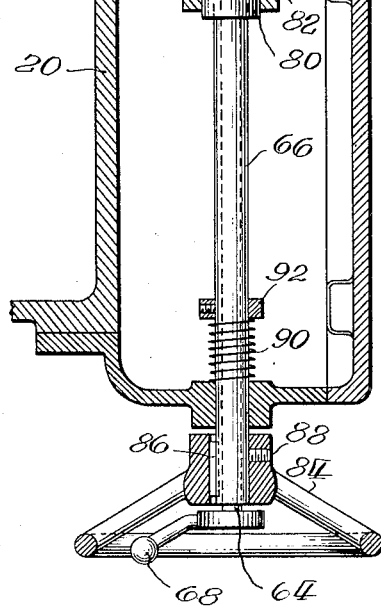
Inventors.
Harry W. Bockhoff
Ralph Rodal
By Williams, Bradbury, McCaleb & Hinkle
Attys.

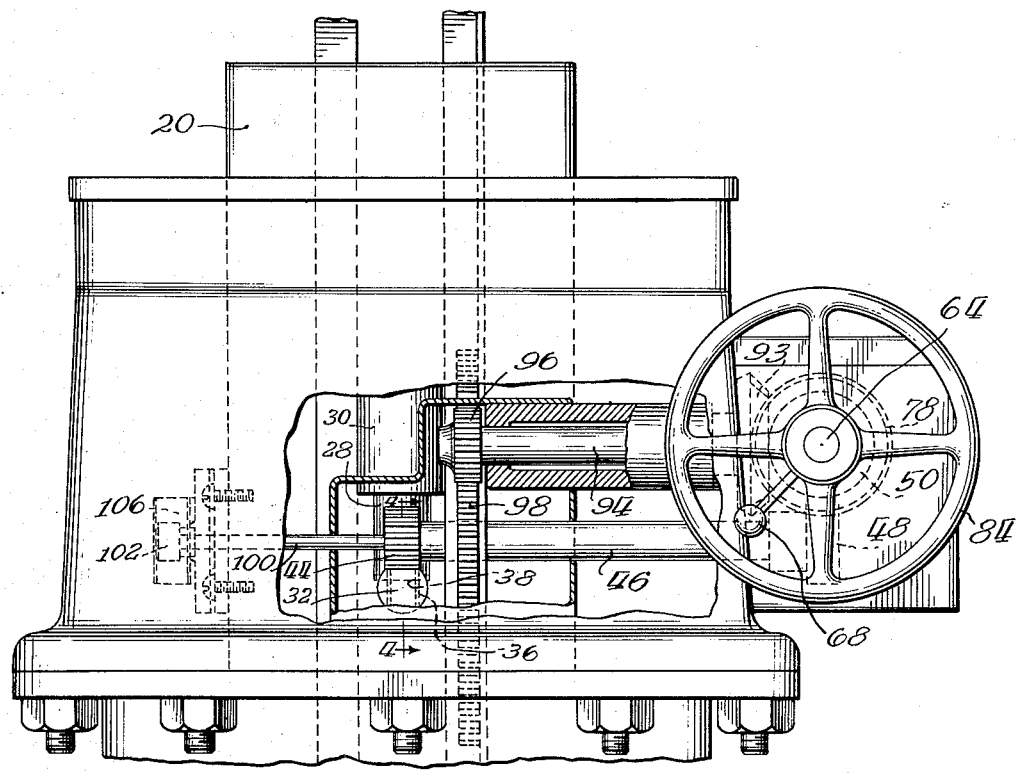
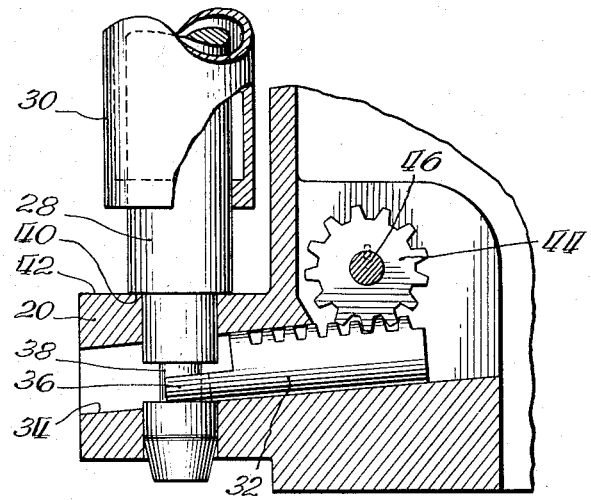
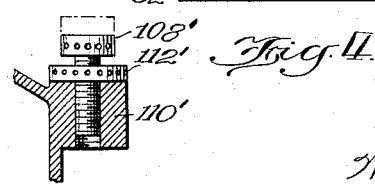

Oct. 17, 1939.  H. W. BOCKHOFF ET AL  2,176,414
DRILLING MACHINE WITH TAPPING ATTACHMENT
Filed Nov. 6, 1937  3 Sheets-Sheet 3
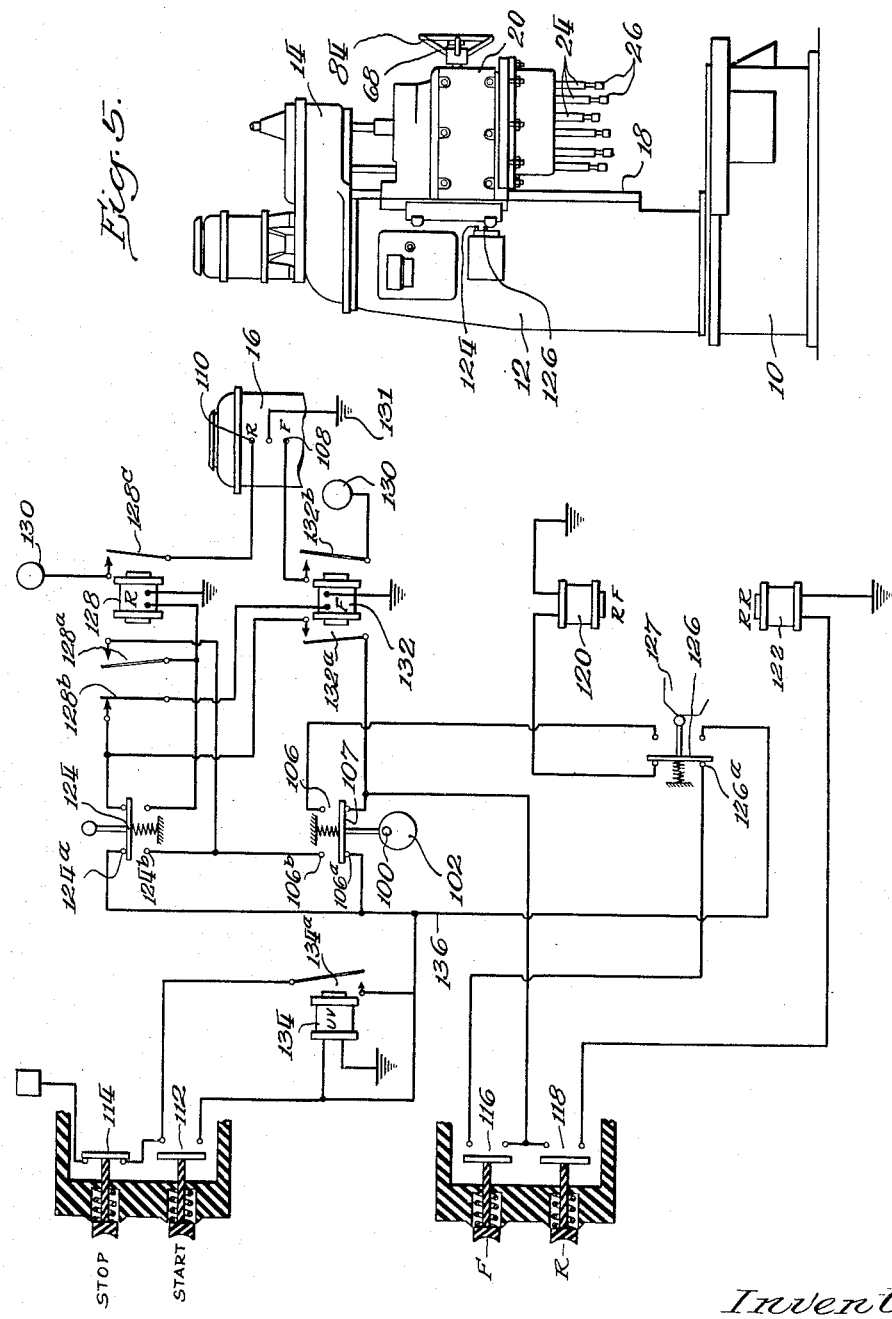
Inventors.
Harry W. Bockhoff
Ralph Rodal
By
Williams, Bradbury, McCaleb & Hinkle
Attys.

Patented Oct. 17, 1939

2,176,414

UNITED STATES PATENT OFFICE 2,176,414

DRILLING MACHINE WITH TAPPING ATTACHMENT

Harry W. Bockhoff and Ralph Rodal, Richmond, Ind., assignors to The National Automatic Tool Company, Richmond, Ind., a corporation of Indiana Application November 6, 1937, Serial No. 173,069

11 Claims. (Cl. 10—130)

Our invention relates generally to machine tools, and more particularly to an improved tapping mechanism for hydraulically controlled drilling machines.

It is generally not feasible to use a machine tool having a hydraulically traversed head of usual construction for tapping operations, because of the possibility that due to slight variations in the rate of feed, the taps may become jammed and broken. It is therefore an object of our invention to provide a machine tool having a hydraulically operated drilling head with improved means whereby the tool may be utilized for performing tapping operations.

A further object is to provide an improved tapping attachment for hydraulically actuated drill heads of machine tools whereby the head and the hydraulic actuating mechanism may be disengaged and the head advanced by hand to feed the taps into the work.

Other objects will appear from the following description, reference being had to the accompanying drawings, in which:

Fig. 1 is a side elevation of a machine tool having a hydraulically actuated drilling head, and incorporating our improved hand feed tapping mechanism;

Fig. 2 is a partially diagrammatic sectional view showing the control and feed means for the hand tapping mechanism;

Fig. 3 is a front elevational view of the drill head, a portion of the casing of the head being broken away and parts removed to show the parts of the hand feed tapping mechanism;

Fig. 4 is a fragmentary sectional view taken on the line 4—4 of Fig. 3;

Figure 5 is a side elevation showing the opposite side of the embodiment illustrated in Figure 1; and Figure 6 is a diagrammatical illustration of the electrical circuits which comprise the electrical means for controlling the hydraulically operated means of the invention.

Referring to Fig. 1, the machine tool comprises a base 10 to which is secured a column 12. A neck 14 is secured at the top of the column 12 and carries a motor 16. The front of the column has ways 18 for a vertically reciprocable head 20, the latter being raised and lowered by hydraulic means and being automatically controlled in the well-known manner. The head 20 is provided with a cluster box 22 from which a plurality of spindles 24 project, the spindles being illustrated as carrying taps 26. The taps are preferably connected to the spindles by "floating" connections which permit limited longitudinal movement of the taps with respect to their spindles.

As best shown in Figs. 2 and 4, the head 20 is adapted to be raised and lowered by a piston rod 28 which is reciprocable in a hydraulic cylinder 30 secured to the column 12 of the machine. A detachable interlocking connection between the piston rod 28 and the head 20 is provided by means of a shot bolt 32 which is slidable in a bore 34 formed in a suitable part of the casting of the head 20 and has a bifurcated end 36 which is adapted to engage about a reduced diameter portion 38 of the piston rod 28. The piston rod 28 is provided with a suitable shoulder 40 adapted to abut against a machined surface 42 formed on the casting 20 and to be locked thereagainst by the shot bolt 32 when the latter is projected to the rear (to the left Fig. 4). To assure that the shot bolt will lock the casting of the head 20 securely against the shoulder, the bore 34 is at an angle of approximately 5° relative to the horizontal, and thus the shot bolt may wedge itself firmly around the reduced portion 38 of the piston rod and securely lock the head 20 to the piston rod.

The shot bolt 32 is actuated by means of a pinion 44 keyed to a shaft 46 which is suitably journaled in the head 20 and at its right hand end (Fig. 2) carries a helical gear 48. The helical gear 48 meshes with a complementary pinion 50 secured to a shaft 52. The outer end of the shaft 52 is provided with a screw threaded portion 54 engaging an internally threaded bushing 56 which is secured against rotation by one or more cap screws 58. A lock nut 60 is secured to the end of the threaded portion 54, being held in position by a set screw 62. A shaft 64 is keyed to the shaft 52 and extends through a tubular shaft 66. A handle 68 is secured to the outer end of the shaft 64. A clutch member 70 is secured to the tubular shaft 66 and is cooperable with a complementary member 76 formed on a bevel gear 78. The bevel gear 78 is provided with a hub 80, and is freely rotatable in its bearing and with respect to the tubular shaft 66. A handwheel 84 is non-rotatably secured to the end of the tubular shaft 66 by means of a key 86 and is locked in position by means of a set screw 88. A compression coil spring 90 engages a collar 92 secured to the tubular shaft 66 and normally urges the tubular shaft 66 rearwardly to cause disengagement of the clutch members 70 and 76.

The bevel gear 78 meshes with a bevel pinion 93 keyed to the end of a shaft 94, to the other end of which a spur gear 96 is keyed. The spur gear 96 meshes with a rack 98 which is fixed to the column 12 of the machine.

The shaft 46 has a reduced diameter extension 100 which at its end carries a cam 102. The cam 102 is engageable with the end of a plunger 104 which actuates a limit switch 106.

An adjustable stop 108' carried by a projection 110' fixed with respect to the column 12, is provided to limit downward movement of the piston rod 28, the stop 108' being adapted to be locked in adjusted position by means of a suitable lock nut 112'.

Referring now to Figs. 5 and 6 for a consideration of the electrical means employed to control and operate the machine tool in its several uses, the electrical units of the several circuits comprise the forward winding 108 and the reverse winding 110 of the motor 16; a normally open "Start" contact switch 112; a normally closed "Stop" contact 114; two normally open contact switches, 116 and 118 for the rapid forward traverse solenoid 120 and for the rapid reverse solenoid 122, respectively, which in turn operate in a well known manner a valve (not shown) which controls the hydraulic movement of the piston 28; a four pole double contact tap limit switch 124; a four pole double contact switch 126 carried by the column 12, see Fig. 5, and actuated by the cam 127 on the head 20 when the head is at an upper limit; the reverse relay 128 controlling a normally open switch 128a and a normally closed switch 128b, also the switch 128c which when closed, completes a circuit through the reverse winding 110 between the power lines 130 and 131; a forward relay 132 which controls two normally open switches 132a and 132b, the latter completing, when closed, a circuit through the forward winding 108 of the motor; and, the limit switch 106 already referred to which comprises a four pole double contact construction controlled by the cam 102.

In using the machine tool in a drilling operation, the handle 68 is turned clockwise, (Fig. 3), thus causing the screw portion 54, (Fig. 2), of the shaft 52 to feed into the bushing 56 substantially to the position in which it is shown in Fig. 2. During this rotation of the shaft 52, the helical pinion 50 drives the helical gear 48 and hence rotates the shaft 46 in a clockwise (Fig. 4) direction to move the shot bolt 32 into locking engagement with the piston rod 28. If the head 20 does not happen to be in exactly the correct position with respect to the piston rod 28, the shot bolt will wedge the head upwardly to such position to cause engagement of its surface 42 against the shoulder 40 of the piston rod. Under these circumstances, the movement of the handle 68 as described has moved the cam 102 to permit the contact 107 of the switch 106 to close the poles of 106a. With the parts in this position, the machine may be used to perform drilling operations in the usual manner, utilizing the customary automatic electro-hydraulic controls and operating means for the rapid traverse, feed, reverse feed, and reverse rapid traverse, as follows:

With the poles 106a closed, the start switch 112 is pressed, the under voltage relay 134 is energized thereby and establishes a holding circuit in a well known manner through the switch 134a to furnish power to the line 136. The closure of the poles 124a of the limit switch when the head 20 is raised, energizes from the line 136 the forward relay 132 through the normally closed switch 128b. Switch 132a closes, thereby creating a holding circuit which includes the limit switch 106a and the normally closed switch 128b. The forward relay 132 also closes the power contactor 132b to start the motor 16 forward by energizing the forward winding 108. Thereafter, the motor will run forward continuously.

The forward traverse switch 116 is now closed and this energizes the rapid forward traverse solenoid 120 through the cam closed switch 126a and the manually set switch 106a. Thereafter, the head completes one drilling cycle automatically in which a feed traverse and a rapid return is accomplished, it being appreciated that the traverse of the head may be reversed at any time during the cycle by closing the reverse switch 118 which energizes the rapid reverse solenoid 122.

When, however, it is desired to use the machine to perform tapping operations, the head may be actuated hydraulically for the rapid forward or downward traverse to bring the taps into position adjacent the work, the control dogs being set so that the head will discontinue its downward movement just prior to the engagement of the taps with the work, with the end of the piston rod 28 abutting against the adjustable stop 108'. After the head has stopped in this position, the operator will swing the handle 68 counter-clockwise, (Fig. 3), whereupon the shaft 52 will be rotated, and, due to its threaded part 54, will move longitudinally until the nut 60 engages the face of the bushing 56, against which it locks. During this rotary movement of the shaft 52, the helical pinion 50 carried thereby will rotate the helical gear 48 and hence the shaft 46 and pinion 44 counter-clockwise, thus withdrawing the shot bolt 32 from the groove in the piston rod 28 around the reduced diameter portion 38 thereof and operating the limit switch 106 to break the switch 106a and render the control for the hydraulic traverse inoperative and to close the switch 106b to make ready the circuit for automatically reversing the motor 16. When the shot bolt 32 is thus withdrawn, the head 20 may be freely traversed by hand while the piston rod 28 remains stationary.

The forward movement of the shaft 52 caused by the counter-clockwise movement of the handle 68 thereafter causes the engagement of the clutch member 70 with its complementary member 76, whereupon a driving connection between the tubular shaft 66 and the bevel gear 78 is established. Thereafter, the head may be traversed downwardly to feed the taps into the work by rotating the hand-wheel 84. The latter will, through the tubular shaft 66, bevel gears 78, and 93, shaft 94, the spur gear 96, cause the head to move downwardly with respect to the fixed rack 98. By observing the rate of feed of the taps 26 into the work, the operator may bring the head down at the required tapping speed. As previously stated, the tapping tools are preferably connected to their respective spindles by a suitable connection which permits an appreciable amount of longitudinal movement of the taps with respect to their spindles. Because of this type of connection of the taps with the spindles, the operator is permitted a considerable latitude with respect to the rate at which the head may be advanced and retracted. After the holes in the work have been tapped to a sufficient depth, the direction of rotation of the taps may be reversed and the head raised manually in accordance with the rate at which the taps feed out of the work. Reversal of the taps is accomplished by automatically reversing in a well-known manner the contact of the tap switch 124 when the predetermined depth is reached.

With the reversal of the tap limit switch, the contact and poles 124b complete a circuit through the reverse relay 128 which when energized breaks the relay switch 128b to drop out the forward relay 132 and to close the contact switch 128c to furnish power to the reverse winding 110 of the motor. A holding circuit for the reverse relay is established when its relay switch 128a closes. This reverses the direction of rotation of the taps for withdrawal and after the taps clear their cuts the tap limit switch 124 returns to its starting position. The reverse winding 110 of the motor 16 is held in by the holding circuit 128a. This holding circuit is dropped out when the handle 68 is turned clockwise to engage the shot-bolt and operates switch 106. When switch 106 is operated, contact 106b is opened and this breaks the holding circuit of 128a and closes contact 128b. Then, with tap limit switch 124 at its starting, the closing of the contact 128b energizes the forward relay 132 to start the forward turning of the taps for the next cycle.

After the direction of rotation of the taps has been reversed and they have been drawn from the work and the head returned to the position at which the tapping operation was started, the operator will swing the handle 68 clockwise, thereby disengaging the clutch part 70 from the clutch part 76 and reengaging the shot bolt 32 in the groove surrounding the reduced diameter portion 38 of the piston rod 28. At the same time, the cam 102 will actuate the limit switch 106 to recondition the machine for initiation of automatic control and cause the rapid reverse, (upward), traverse of the head 20 so as to clear the taps sufficiently from the work to permit removal of the latter from the machine.

If desired, the rapid traverse operations of the head to and from the work, as well as the forward and reverse feed traverse operations, may be performed manually, in which event, the clutch 76, 70 will be kept engaged and the shot bolt 32 disengaged. When the machine is operated in this manner, the automatic controls will be utilized only for the purpose of automatically reversing the spindle driving motor at the ends of its stroke.

Although the invention has been illustrated and described as applied to a vertical column type of machine, it may be utilized in a horizontal type with equal advantage.

While we have shown and described a particular embodiment of our invention, it will be readily understood by those skilled in the art that variations may be made in the construction disclosed without departing from the basic features of our invention. We therefore do not wish to be limited to the precise construction disclosed, but wish to include within the scope of the invention all such modifications and variations which will readily suggest themselves.

What we claim as new and desire to secure by United States Letters Patent is:

1. In a machine tool, the combination of a head having a plurality of rotatable spindles carrying taps, automatically controlled hydraulic means for traversing said spindles toward and away from the work, hand operated means to traverse said head by hand for slow feeding movement thereof, and manually operated means to disconnect said head from said hydraulic traversing means and to condition said hand operated means for moving said head free of said hydraulic means during the operations of feeding and withdrawing taps from the work.

2. In an automatic drilling and tapping machine, the combination of a tool carrying head, automatic means for rapidly traversing said head toward and away from the work, manually operated means for feeding said head into and out of the work during tapping operations, and manually operable mechanically connecting and disconnecting means for simultaneously rendering said automatic means inoperative and rendering said manually operated means operative.

3. In a machine of the class described, the combination of a head, automatic means for moving said head toward and away from the work to be machined, manually operated means for moving the head slowly toward and away from the work, and means for disengaging said automatically operated means and engaging said manually operated means to permit hand feeding of the head toward and away from the work free of said automatic means.

4. In a machine tool, the combination of a column, a head reciprocable on said column, hydraulic means for traversing said head, manually operable means for traversing said head, and manually operable mechanically connecting and disconnecting means for simultaneously disengaging said hydraulic means from said head and rendering said manually operable traversing means operative.

5. In a machine tool, the combination of ways, a head guided for movement on said ways and carrying a plurality of rotatable spindles, a rack fixed with respect to said ways, a pinion carried by said head and engaging said rack, a hand wheel, a driving connection between said hand wheel and said pinion, said driving connection including a clutch, hydraulically operated means for traversing said head on said ways, said last named means including a piston rod having a groove formed therein, a shot bolt carried by said head and engageable in said groove to lock said head to said piston rod, and a single manually operable element for causing engagement and disengagement of said clutch and disengagement and engagement of said shot bolt with said piston rod.

6. In a machine tool, the combination of a body having ways, a head reciprocable on said ways, a plurality of rotatable spindles mounted in said head, hydraulic means for actuating said head, said hydraulic means including a cylinder and a piston rod, means for mechanically interlocking and disconnecting one of said last named elements with said head, manually operated means for actuating said interlocking means, and manually operable means for traversing said head on said ways.

7. In a machine tool, the combination of a body having ways, a head reciprocable on said ways, a spindle carried by said head, means to rotate said spindle, hydraulically operated means for traversing said head relative to said ways, a separable connection between said hydraulically operated means and said head, manually operable means for traversing said head relative to said ways, and a single manually operable control element for alternatively rendering said manually operated traversing means in operable and disengaging said separable connection.

8. In a machine tool, the combination of a body having ways, a head reciprocable on said ways, a plurality of rotatable spindles carried by said head, hydraulically operated means for traversing said head relative to said ways, electrical means for controlling said hydraulically operated means, said electrical means including a limit switch, a separable connection between said hydraulically operated means and said head, manually operated means for traversing said head relative to said ways, and a manually operated control element effective when operated in one direction to disengage said separable connection, render said manually operated traversing means operative, and operating said limit switch, and when operated in the opposite direction, engaging said separable connection, rendering said manually operable traversing means inoperative, and operating said limit switch.

9. In a machine of the class described, the combination of a head, automatic means for traversing said head toward and away from the work to be machined, manually operated means for traversing said head into and out of the work, and mechanically connecting and disconnecting means for rendering said automatic means inoperative and engaging said manually operated means to permit manual feeding of the head toward and away from the work, whereby tapping operations may be effected.

10. In a machine tool, the combination of a body having ways, a head reciprocable on said ways, hydraulic means for actuating said head, including a cylinder and a piston rod, means for quickly interlocking and disconnecting one of said last named elements with said head, manually operated means for actuating said interlocking means, and manually operable means normally operative for traversing said head on said ways only when said head is disconnected.

11. In a machine tool, the combination of a body having ways, a head reciprocable on said ways, hydraulically operated means for traversing said head upon said ways, a shot bolt for interlocking said hydraulically operated means and said head, manually operable means for traversing said head relative to said ways, said last named means including a clutch and a single manually operable control element for operating said clutch to render said manually operated traversing means operable and for moving said shot bolt to non-interlocking position.

HARRY W. BOCKHOFF.
RALPH RODAL.